G. E. SAVAGE.
Assignor to the MERIDEN BRITANNIA COMPANY.
Butter-Dish.
No. 8,179. Reissued April 16, 1878.
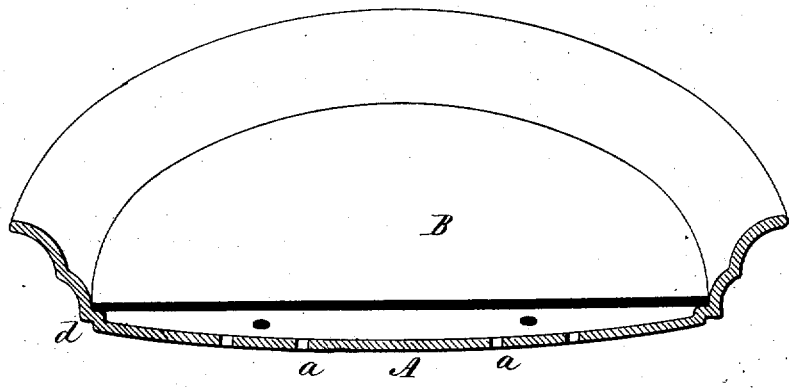
Witnesses.
J. H. Chumway
C. A. Fulton
Geo. E. Savage
Inventor
By atty.
Wm. D. Cook
N. PETERS, PHOTO-LITHOGRAPHER, WASHINGTON, D. C.

UNITED STATES PATENT OFFICE.

GEORGE E. SAVAGE, OF WEST MERIDEN, CONNECTICUT, ASSIGNOR TO THE MERIDEN BRITANNIA COMPANY, OF SAME PLACE.

IMPROVEMENT IN BUTTER-DISHES.

Specification forming part of Letters Patent No. 176,358, dated April 18, 1876; Reissue No. 8,179, dated April 16, 1878; application filed April 3, 1878.

*To all whom it may concern:*

Be it known that I, GEORGE E. SAVAGE, of West Meriden, in the county of New Haven and State of Connecticut, have invented a new Improvement in Protectors for Flat Plated Articles of Table-Service; and I do hereby declare the following, when taken in connection with the accompanying drawing and the letters of reference marked thereon, to be a full, clear, and exact description of the same, and which said drawing constitutes part of this specification, and represents a sectional perspective view of the invention as applied to a butter-dish drainer.

This invention relates to an improvement in that class of metallic articles for table and similar service made from silver or plated metal, and which consists of a flat plate with a surrounding border, and in which the flat surface is exposed to a defacing wear, the object of the invention being to protect such flat surface from such wear and preserve it in its original highly-finished condition; and it consists in the introduction of a plate of glass within the border to cover the exposed flat surface, and without in any way hiding or affecting the appearance of that flat surface, and so that the glass itself becomes the actual surface of contact, instead of the metal.

In the accompanying illustration the invention is shown as applied to a butter-dish drainer, which is a sufficient illustration of its application to enable those skilled in the art to successfully apply it.

In this illustration, A represents the flat portion, substantially of usual form, and on which the butter is usually placed, and which is unavoidably more or less defaced by cutting from the butter on the plate. B, the glass-plate fitting closely within the border and so as to cover the wearing or exposed flat surface, and becoming itself the actual wearing-surface, but, because of its transparency, exposing the plate below, so that the appearance of the metal plate is not materially changed by the introduction of the glass plate.

This glass plate prevents all possible defacing of the metal plate below, and also enables the making of the metallic plate of lighter or softer metal than when that metal plate is forced to withstand the usual wear.

I claim—

In articles of silver or plated ware consisting of a flat metal plate and border, the combination therewith of a glass disk to cover and protect the said flat plate, substantially as described.

GEO. E. SAVAGE.

Witnesses:
J. M. HARMON,
GEO. R. CURTIS.